(12) United States Patent
Zhang et al.

(10) Patent No.: US 8,139,586 B2
(45) Date of Patent: *Mar. 20, 2012

(54) ENHANCED PACKET CLASSIFICATION

(75) Inventors: Ming Zhang, San Jose, CA (US); Ram Krisnan, Sunnyvale, CA (US); Jonathan J. Chang, Cupertino, CA (US); Flavio Giovanni Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,757

(22) Filed: Aug. 20, 2010

(65) Prior Publication Data

US 2010/0309917 A1 Dec. 9, 2010

Related U.S. Application Data

(63) Continuation of application No. 11/745,078, filed on May 7, 2007, now Pat. No. 7,782,859.

(51) Int. Cl.
*H04L 12/28* (2006.01)
*H04L 12/56* (2006.01)
*G06F 9/26* (2006.01)
*G06F 9/34* (2006.01)

(52) U.S. Cl. .................. 370/395.31; 370/392; 711/202; 711/221

(58) Field of Classification Search .................. 370/392
See application file for complete search history.

(56) References Cited

U.S. PATENT DOCUMENTS

| 6,970,462 | B1 | 11/2005 | McRae | |
|---|---|---|---|---|
| 7,043,467 | B1 * | 5/2006 | Milito et al. | 706/45 |
| 7,782,859 | B2 | 8/2010 | Zhang et al. | |
| 2006/0002292 | A1 * | 1/2006 | Chang et al. | 370/225 |
| 2007/0112794 | A1 * | 5/2007 | McRae | 707/100 |
| 2007/0168377 | A1 * | 7/2007 | Zabarsky | 707/102 |
| 2008/0205403 | A1 * | 8/2008 | Akyol et al. | 370/392 |
| 2008/0279185 | A1 | 11/2008 | Zhang et al. | |

OTHER PUBLICATIONS

"Scalable Packet Classification: Using Bit Vector Aggregating and Folding", MIT LCS Technical Memo: MIT-LCS-TM-637, (Apr. 2003), 9 pgs.

Gupta. Pankaj, et al., "Algorithms for Packet Classification", IEEE Network, (Mar. 2001), 29 pgs.

(Continued)

*Primary Examiner* — Marsha D Banks Harold
*Assistant Examiner* — Saad Hassan
(74) *Attorney, Agent, or Firm* — Schwegman, Lundberg & Woessner, P.A.

(57) ABSTRACT

A method for classifying a data packet containing a header is provided. The method may comprise parsing the header of a data packet into header elements. Rules in secondary lookup tables generated from a primary lookup table may be accessed. The respective header elements of the data packet may be compared to the respective fields of each of the secondary lookup tables, and rule results for each of the secondary lookup tables in a combinable format may be generated. In another embodiment, a method for generating secondary lookup tables from a primary lookup table is provided. The method may comprise accessing a primary lookup table defining packet classification rules and generating multiple secondary lookup tables from the primary lookup table. For each secondary lookup table, a selection of classification rules and a selection of fields of the multiple fields based on a rule set identifying predefined entries may be extracted.

20 Claims, 10 Drawing Sheets

OTHER PUBLICATIONS

Lakshman, T. V, et al., "high-Speed Policy-Based Packet Forwarding Using Efficient Multi-Dimensional Range Matching", Proceedings of the ACM SIGCOMM '98 conference on Applications, technologies, architectures, and protocols for computer communication, (1998), 12 pgs.

U.S. Appl. No. 11/745,078 Notice of Allowance mailed Apr. 19, 2010, 9 pgs.

U.S. Appl. No. 11/745,078, Final Office Action mailed Nov. 2, 2009, 18 pgs.

U.S. Appl. No. 11/745,078, Non-Final Office Action mailed Jun. 2, 2009, 18 pgs.

U.S. Appl. No. 11/745,078, Response filed Oct. 2, 2009 to Non Final Office Action mailed Jun. 2, 2009, 12 pgs.

U.S. Appl. No. 11/745,078, Advisory Action mailed Feb. 18, 2010, 3 pgs.

U.S. Appl. No. 11/745,078, Examiner Interview Summary filed May 19, 2010, 1 pg.

U.S. Appl. No. 11/745,078, Response filed Feb. 2, 2010 to Final Office Action mailed Nov. 2, 2009, 9 pgs.

\* cited by examiner

| | FIELD 1 | FIELD 2 | FIELD 3 | .... | FIELD N-1 |
|---|---|---|---|---|---|
| RULE A | Element A1 | Element A2 | Element A3 | | Element A(N-1) |
| ⋮ | | | | | |
| RULE M | Wildcard | Element M2 | Element M3 | | Element D(N-1) |

*FIG. 5*

| | FIELD 2 | FIELD 3 | .... | FIELD N |
|---|---|---|---|---|
| RULE B | Element B2 | Wildcard | | Element BN |
| ⋮ | | | | |
| RULE M | Element M2 | Element M3 | | Wildcard |

*FIG. 6*

| ACL | DESTINATION IP | DESTINATION PORT | PROTOCOL |
|---|---|---|---|
| 2 | 30.1.0.0/16 | 22 | UDP |
| 5 | 60.1.1.1 | 40-100 | TCP |

FIG. 11

| ACL | SOURCE IP | DESTINATION IP | SOURCE PORT | PROTOCOL |
|---|---|---|---|---|
| 4 | 20.0.0.8/8 | 60.1.1.0/24 | 40 | TCP |
| 7 | 100.2.0.0/16 | 80.1.0.0/16 | 50 | TCP |

FIG. 12

ENHANCED PACKET CLASSIFICATION

CLAIM OF PRIORITY

This application is a continuation of and claims the benefit of priority under 35 U.S.C. § 120 to U.S. patent application Ser. No. 11/745,078, entitled "ENHANCED PACKET CLASSIFICATION," filed on May 7, 2007, which is hereby incorporated by reference herein in its entirety.

FIELD

The present disclosure relates generally to the field of processing digital data, for example data packets in a communication network. In one example embodiment, the disclosure relates to enhanced classification of data packets, for example to improve the granularity of classification lookup tables.

BACKGROUND

One of the key functionalities of network devices such as routers is to parse the headers and in some cases the payloads of data packets in order to obtain information necessary to route data packets across a network. This information, which may include transport protocols, port numbers and source and destination addresses, may be used to classify packets in order to assign certain actions or determine measurements on the data packets and their transmission. For example, the information may be used to provide differentiated services to customers by providing customizable performance or bandwidth in accordance with service agreements. The information may additionally or alternatively be used to limit access of unauthorized users to parts of the network or to drop and/or redirect data packets.

In some instances, access control lists (ACLs) may implement the complex policies and filtering rules necessary for the above process. The ACLs may be sequential in nature, with incoming packets being sequentially compared to a list of rules. Due to networking becoming more complex, the rules may be quite complex. As processors may need to literally compare each rule or set of fields (e.g., that form part of a lookup key) sequentially with a packet until a match is found, the classification performance may be highly dependent on the complexity and number of rules.

In many applications the lookup table (or lookup key size) is fixed, although the fields necessary for classification, as well as the size of each field for different protocol stacks, may differ. Also, in a typical ACL configuration many fields may not be relevant to the classification of the packet. For example, fields may be "don't care" or wildcard fields that need not be included in the lookup key or rule set.

BRIEF DESCRIPTION OF DRAWINGS

The present disclosure is illustrated by way of example and not limitation in the figures of the accompanying drawings, in which like references indicate similar elements and in which:

FIGS. 5 and 6 show example embodiments of secondary lookup tables extracted from the primary lookup table of FIG. 4 using wildcard entries as part of a rule set;

FIGS. 10 to 12 show example embodiments of secondary lookup tables generated from the primary lookup table of FIG. 9 using "don't care" or wildcard entries as part of a rule set, in accordance with an example embodiment;

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method for classifying a data packet containing a header is provided. The method may comprise parsing the header of a data packet into header elements. The method may further comprise accessing rules in secondary lookup tables generated from a primary lookup table based on a rule set associated with a commonality of entries in the primary lookup table, comparing the respective header elements of the data packet to the respective fields of each of the secondary lookup tables, and generating rule results for each of the secondary lookup tables in a combinable format.

Example Embodiments

Figure 1:
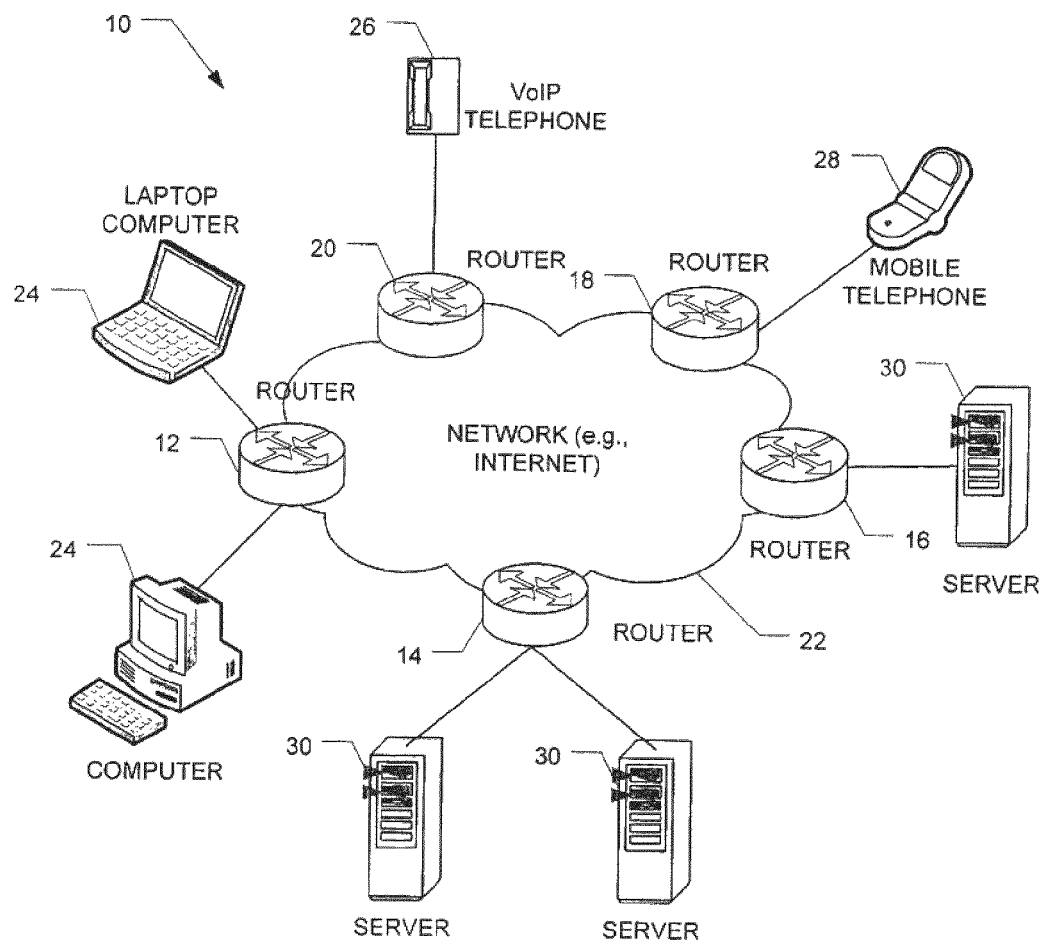
FIG. 1 shows an example of a system in which an example embodiment of the disclosure may be implemented.

Referring to FIG. 1, reference numeral 10 generally indicates a system, in accordance with an example embodiment, to communicate data between various network devices and network endpoints. In the example system 10, the network devices are shown to be routers 12, 14, 16, 18 and 20. However, it will be appreciated that any number of routers 12 to 20 may be provided in the system 10. The routers 12 to 20 are shown to be connected via a network which may include one or more Local Area Networks (LANs) and/or Wide Area Networks (WANs) such as the Internet. The system 10 is also shown to include a plurality of endpoints including, for example, a plurality of computers 24 (only two of which are shown in FIG. 1), one or more Voice-over-IP (VoIP) telephones 26, one or more mobile telephones 28, and a plurality of servers 30 (only three of which are shown in FIG. 1).

In the example system 10, data is communicated via data packets or datagrams using any suitable communication protocol(s). For example, packets may be communicated using the TCP/HTTP protocol or the UDP protocol. Further, although the system 10 is shown to include routers 12 to 20, it should be noted that the example embodiments described herein are equally applicable to other network devices such as switches or the like. Broadly, the example embodiments described herein may be deployed in any network device which receives digital data for processing and communication to another network device.

In an example embodiment, data packets may be received by a network device, such as any of the routers 12 to 20, and the data packets may be processed or analyzed to identify a particular action associated with the packet. Alternatively, the data packets may be processed or analyzed to obtain certain measurements relating to the transmission of the packets. For example, the network device may analyze the header of a data packet in order to retrieve information relating to the particular transport protocol of the data packet, relevant port numbers and source and destination addresses associated with the data packet. This information is compared to values in a rule set or lookup table, e.g., access control lists (ACLs), with each rule or set of fields being mapped to an appropriate action to be taken by the network device. This process is described in more detail below, in accordance with example embodiments.

Figure 2:
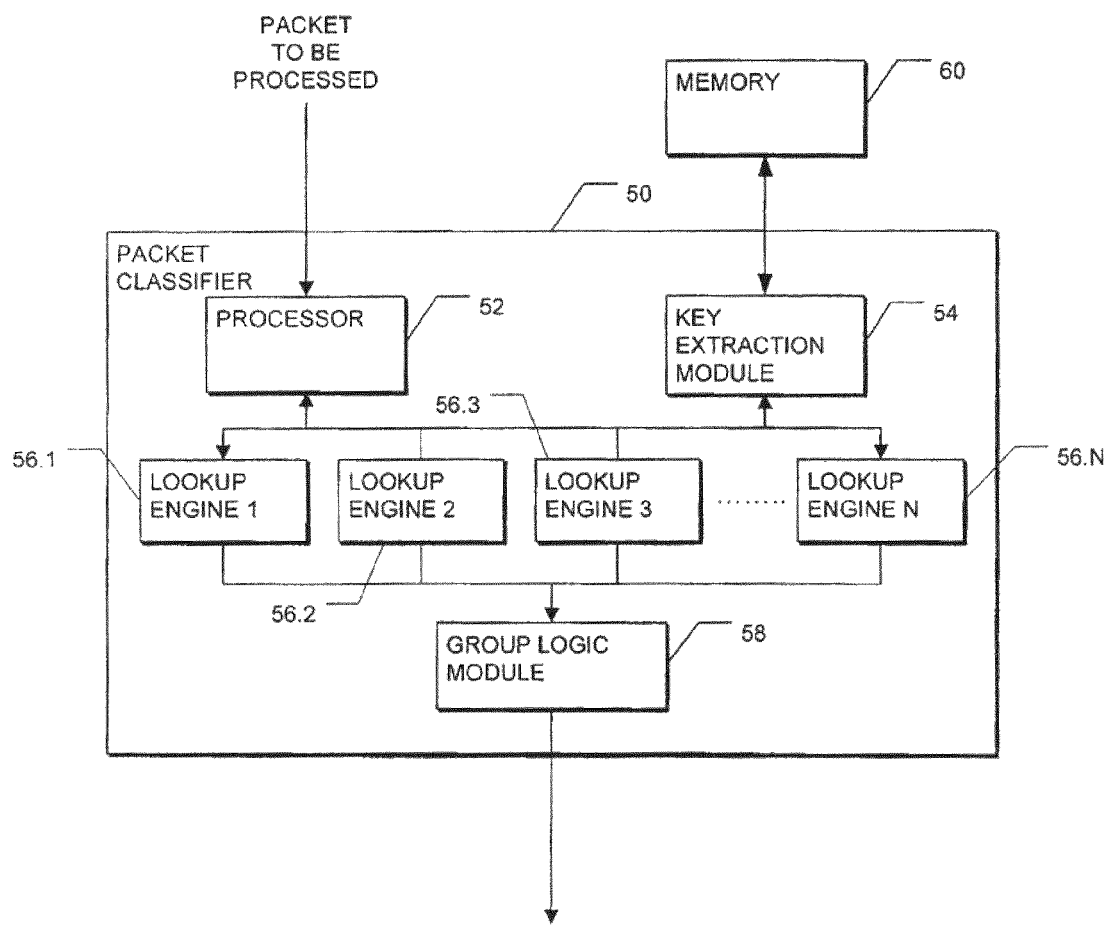
FIG. 2 shows an example apparatus in the form of a packet classifier that may form part of a network device included in the system of FIG. 1.

Referring to FIG. 2, an apparatus is shown in the form of a packet classifier 50 that may, in one example embodiment, form part of one of the network devices depicted in FIG. 1, e.g., routers 12 to 20. However, it will be appreciated that the packet classifier 50 may be deployed in any network device which receives digital data for communication to other network devices, for example devices such as switches or the like.

In one example embodiment, the packet classifier 50 is shown to include a processor 52, key extraction module 54, a lookup engine which may, in one example, comprise multiple lookup engines 56.1 to 56.N. The packet classifier may also include a group logic module 58. It should be noted that the number of lookup engines (56.1 to 56.N) may differ between applications and may be dependent on the configuration of an example lookup or rule table, as will be described in more detail below.

The processor 52, key extraction module 54, lookup engines 56.1 to 56.N and group logic module 58 may be communicatively coupled (e.g., via appropriate interfaces) to each other and to various data sources, so as to allow information to be passed between the modules or so as to allow the modules to share and access common data. It will be appreciated that although the processor 52, key extraction module 54, lookup engines 56.1 to 56.N and group logic module 58 are shown as separate distinct modules, some modules may be sub-modules of other modules. For example, the key extraction module 54 and the group logic module 58 may form part of the processor 52.

Figure 3:
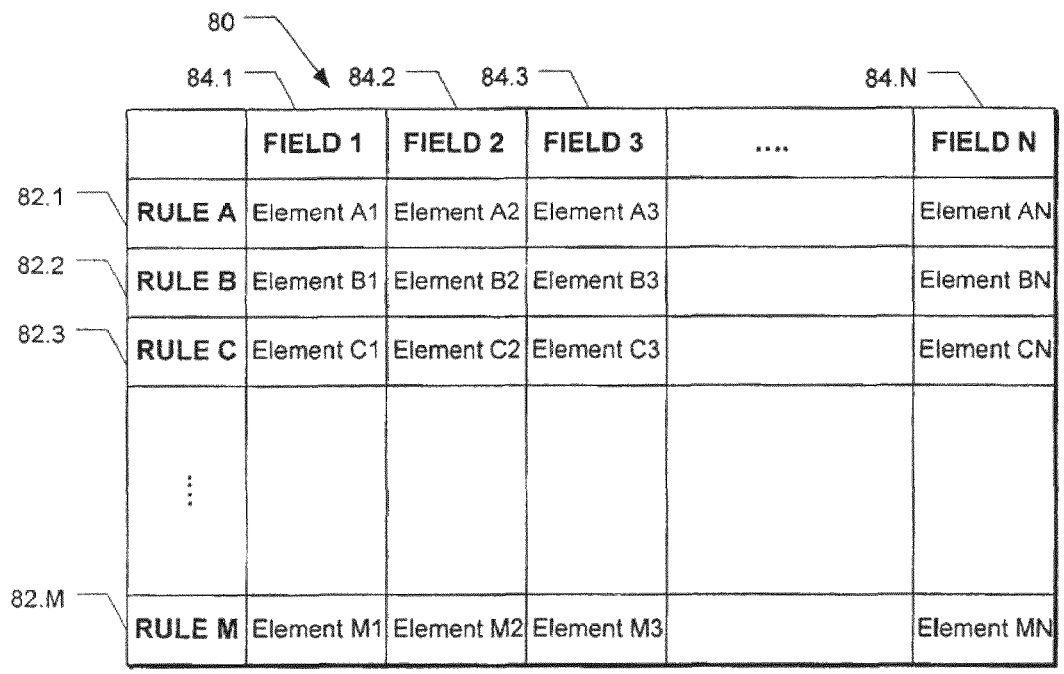
FIG. 3 shows an example embodiment of a primary lookup table in accordance with an example embodiment.

In one example embodiment, the key extraction module 54 is to access a primary lookup or rule table defining packet classification rules. An example embodiment of such a primary lookup table 80 is shown in FIG. 3. In an example embodiment, this primary lookup or rule table 80 may be maintained in memory or a database of the network device in which the packet classifier 50 is deployed.

In the example embodiment of FIG. 3, the primary lookup table 80 is shown to define a plurality of rules, e.g., Rule A to Rule N shown by reference numerals 82.1 to 82.M, with each classification rule 82.1 to 82.M having multiple fields, e.g., Field 1 to Field N, shown by reference numerals 84.1 to 84.N.

As will be described in more detail below, in an example embodiment the lookup or rule table 80 may be ACLs. Other example embodiments of primary lookup tables are forwarding lookup tables and netflow lookup tables.

The key extraction module 54 may generate multiple secondary lookup or rule tables from the primary lookup table 80 by extracting, for each secondary lookup table, a selection of classification rules (e.g., a selection of rules 82.1 to 82.M) and a selection of fields of the multiple fields (e.g., a selection of fields 84.1 to 84.N) based on a rule set identifying predefined entries.

For example, the key extraction module 54 may access a memory 60 that may contain information on the rule set to be used by the key extraction module 54 in order to generate the secondary lookup tables. In one example embodiment, the rule set may comprise rules to identify a commonality of entries in the multiple fields 84.1 to 84.N of the primary lookup table 80 in order to extract the selection of classification rules 82.1 to 82.M and fields 84.1 to 84.N. For example, the commonality of entries in the multiple fields 84.1 to 84.N of the primary lookup table 80 may be wildcard entries, as depicted by the primary lookup table shown by FIG. 4.

Figure 4:
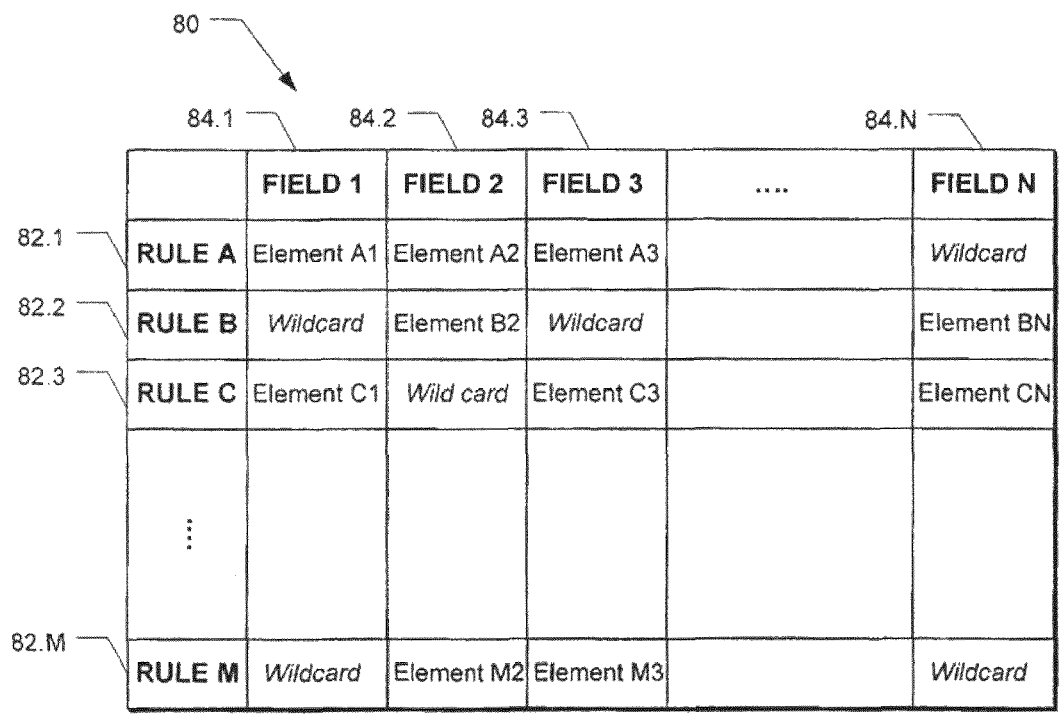
FIG. 4 shows an example of the primary lookup table of FIG. 3 in which some of the field elements are "don't care" or wildcard entries.

The primary lookup table of FIG. 4 shows that amongst others, Rule A (reference numeral 82.1) has a wildcard entry in Field N (shown by reference numeral 84.N), while Rule B (reference numeral 82.2) has two wildcard entries in Fields 1 and 3 (shown by reference numeral 84.1 and 84.3). Similarly, Rule C (reference numeral 82.3) has a wildcard entry in Field 2 (shown by reference numeral 84.2), while Rule D (reference numeral 82.M) has a wildcard entry in Field N.

In accordance with an example embodiment where wild card entries in the various fields 84.1 to 84.N are used as the rule set to generate secondary lookup tables, the key extraction module 54 may examine the primary lookup table 80 of FIG. 4. In this example embodiment the key extraction module 54 may select Fields 1 to (N−1) (reference numerals 84.1 to 84. (N−1)) as a basis for a first secondary lookup table. After the selection of the Fields 1 to (N−1), the entries of non-selected fields (e.g., Field N) are investigated by the key extraction module 54 to find any entries of commonality (e.g., common features or attributes) or in this example embodiment, "don't care" or wildcard entries. The key extraction module 54 may now select the rules containing wildcard entries in the non-selected fields as rules for the first secondary table to be extracted. FIG. 5 shows an example first secondary table 90 generated in accordance with this rule set, where Rule A and Rule M are shown to be included in the table. Similarly, FIG. 6 shows an example second secondary lookup table 92 generated by the key extraction module 54 where Fields 2 and N (reference numerals 84.2 and 84.N) were initially selected as the relevant fields in accordance with the rule set and Rules B and M were extracted into the table 92.

From the two example secondary lookup tables 90 and 92 of FIGS. 5 and 6 it is evident that secondary lookup keys for packet classification may have varying lengths that may, as will be described in more detail below, improve the granularity of the lookup keys and thereby improve the processing time and efficiency of the packet classifier 50. The sizes of the secondary lookup tables may accordingly be changed through configuration, e.g., by different rule sets.

In one example embodiment, once the secondary lookup tables have been generated by the key extraction module 54, the processing of data packets received by a network device may commence. Referring again to FIG. 2, the processor 52 of the packet classifier 50 may parse the header of a data packet into different header elements. For example, the processor 50 may parse the header of a data packet into header elements including a source IP address, destination IP address, source port, destination port and protocol. The fields contained in the header which have been parsed into header elements provide the necessary information to a network device to process and transmit the data packet.

In an example embodiment, the lookup engines 56.1 to 56.N may access the selected rules in the multiple secondary lookup tables (e.g., the secondary lookup tables of FIGS. 5 and 6) generated by the key extraction module 54 from the primary lookup table (e.g., primary lookup table 80 of FIG. 3 or 4). The lookup engines 56.1 to 56.N may further compare the respective header elements of the parsed data packet to each of the field entries in a particular rule of the secondary lookup tables. The lookup engines 56.1 to 56.N may perform the lookup through a traditional Flexible Packet Classification Algorithm (FPCA) or may use ternary content-addressable memory (TCAM) for comparing elements of a data packet to the entries in the respective secondary lookup tables. Any other type of lookup procedure may be used by the lookup engines 56.1 to 56.N or any combination of lookup procedures may be used, provided that the input and output formats of the lookup engines remain the same.

In one example embodiment, the lookup engines 56.1 to 56.N may compare the header elements sequentially to the entries of the different rules. Each lookup engine may be associated with one secondary lookup tables, resulting in the amount of lookup engines being equal to the amount of secondary lookup tables.

It will be appreciated that, by comparing the header elements sequentially to the different rules of the various secondary lookup tables, each of the lookup engines 56.1 to 56.N may generate a rule result for its associated secondary lookup table. In an example embodiment, the rule results generated by each of the lookup engines 56.1 to 56.N are in a combinable format, e.g., the rule results may be bitmaps. Also, the rule results of each lookup engine 56.1 to 56.N may be generated as a bitmap by performing an AND operation on each of the respective rules of the secondary lookup tables.

In one example embodiment, the group logic module 58 may combine the rule results of the multiple lookup engines 56.1 to 56.N to provide a result (e.g., a combined result) for this group as well as perform group to global mapping to get the final result for the primary lookup table 80. For example, the group logic module 58 may perform an AND operation on the bitmap results of the various lookup engines 56.1 to 56.N to provide a combined result for the primary lookup table. This combined result bitmap may then be mapped to a global bitmap (or master bitmap).

For example, the combined logic module 58 may maintain a master bitmap which is cleared before processing a data packet and which is populated by the combined logic module 58 in order to generate the combined rule results for the primary lookup table 80.

For bits forming part of a bitmap result (generated by a lookup engine) having a value of "1", the matching rules in the secondary lookup tables may be inferred by looking up an array. The group logic module 58 may then set the master bitmap for the corresponding matching rules.

In circumstances where only ACL matches are required, only the first "n" ACL entries (ACEs) with the highest priorities are needed, where "n" may be equal to "1" for a traditional ACL. Whether an ACL entry has a high priority may be indicated by the relative significant bit position in the bitmap, e.g., the most significant bit (MSB), which may indicate the highest priority ACE. In circumstances where the ACE has a highest priority, there may be no need to map the entire bitmap, but instead only the first "n" bits of the bitmap are mapped.

A mapping table may further be maintained by the combined logic module 58 in order to map the result of each field of a rule result to the bitmap of a particular secondary lookup table (e.g., generated by the key extraction module). The number of fields associated with a secondary lookup table may determine the width of the secondary lookup table, and may have an associated algorithm to provide a rule result as a bitmap. It will be appreciated that the packet classifier 50 would be able to remap the different fields to different secondary lookup tables through reconfiguration, thereby to support different sizes of secondary lookup tables or the mapping table. For example, while each lookup engine 56.1 to 56.N performs a match with a fixed lookup key size, any lookup engine may be flexibly re-assigned to attend to a different group logic module, and each group handles a secondary lookup table with a different width.

Figure 7:
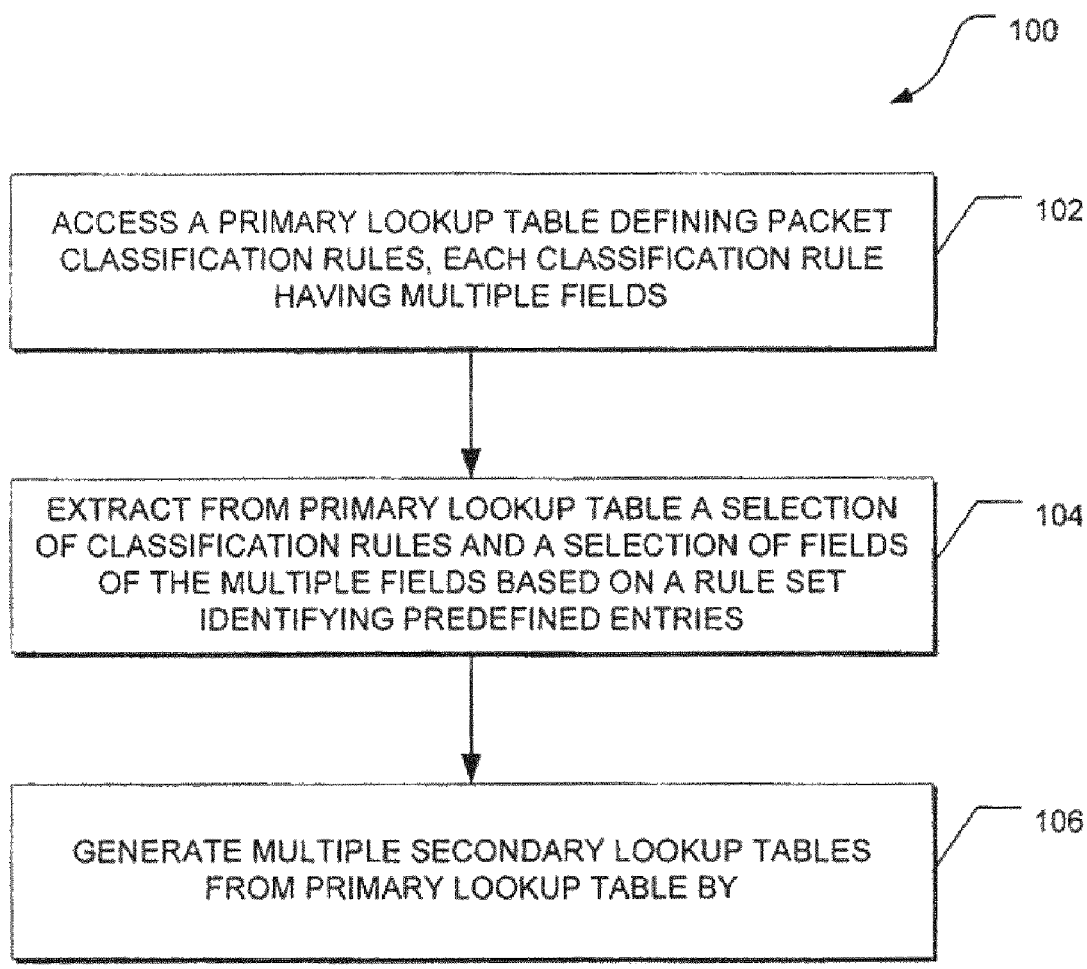
FIG. 7 shows an example of a method, in accordance with an example embodiment, for generating secondary lookup tables from a primary lookup table.

FIG. 7 shows a flow diagram of a method 100, in accordance with an example embodiment, for generating secondary lookup tables from a primary lookup table. In one example embodiment, the method may be implemented by the apparatus shown as a packet classifier 50 of FIG. 2, employed in a network device, such as routers 12 to 20 of FIG. 1.

As shown by block 100, a key extraction module 54 may access a primary lookup table 80, which may define, as described in more detail above, packet classification rules with multiple fields. The key extraction module 54 may extract a selection of classification rules 82.1 to 82.N and a selection of fields of the multiple fields 84.1 to 84.N from the primary lookup table 80, based on a rule set identifying predefined entries (shown by block 102). In response to this extraction, the key extraction module 54 may generate (shown by block 104) multiple secondary lookup tables (e.g., tables 90 and 92 shown in FIGS. 5 and 6) from the primary lookup table 80.

In one example embodiment, the rule set comprises rules to identify a commonality of entries in the multiple fields 84.1 to 84.N of the primary lookup table 80 in order to extract the selection of classification rules and fields. In one particular example embodiment, the commonality of entries in the multiple fields 84.1 to 84.N of the primary lookup table 80 may be wildcard or "don't care" entries.

Figure 8:
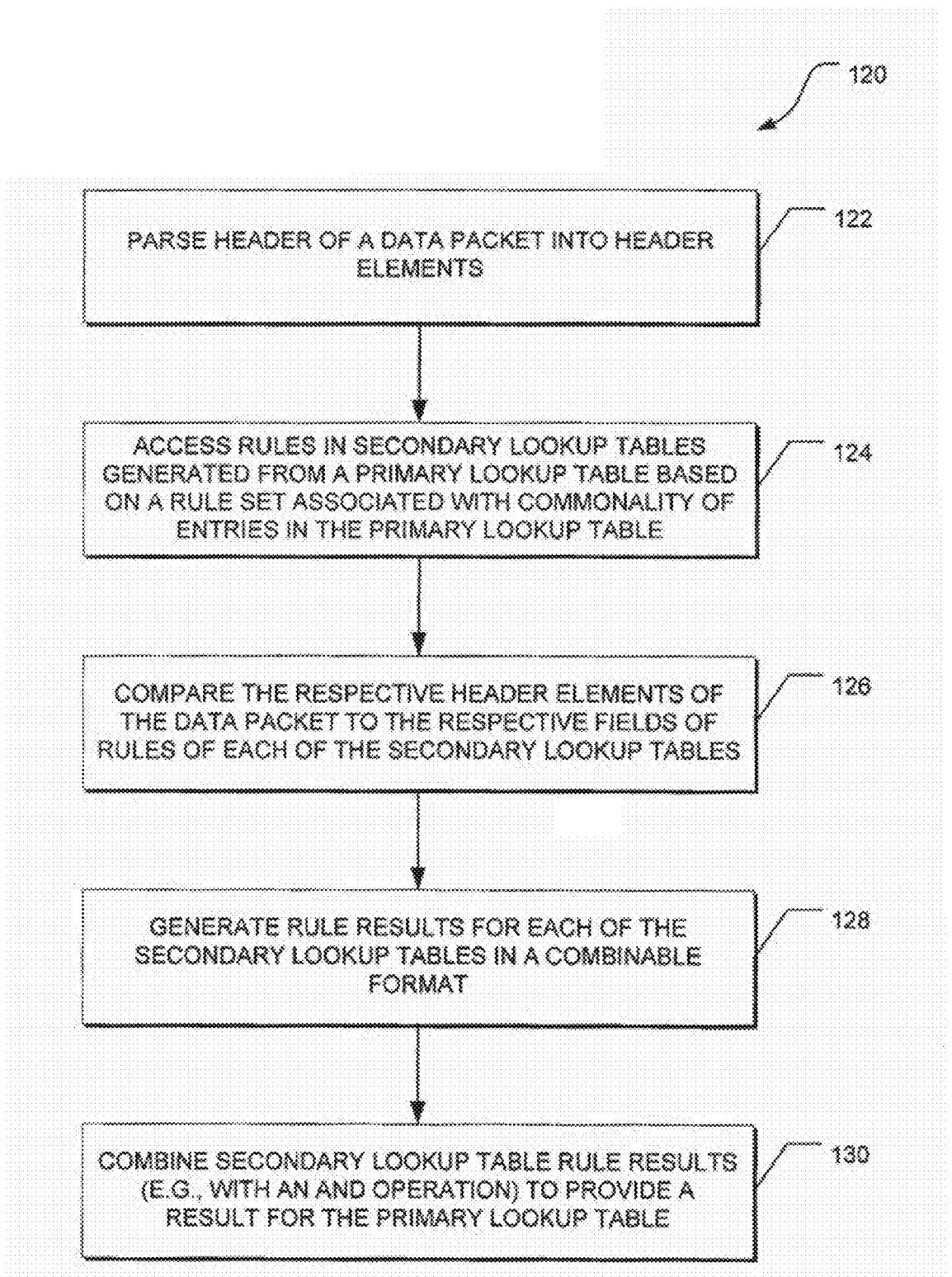
FIG. 8 shows an example of a method, in accordance with an example embodiment, for classifying a data packet.

FIG. 8 shows a flow diagram of a method 120, in accordance with an example embodiment, for classifying a data packet containing a header. In one example embodiment, the method may be implemented by the apparatus of FIG. 2, shown as a packet classifier 50, which may be employed in a network device, such as routers 12 to 20 of FIG. 1.

In the example method 120, a processor 52 parses the header of a data packet into header elements (shown by block 122). As mentioned, the processor 52 may, for example, parse the header into a combination of the following elements: source IP address, destination IP address, source port, destination port and protocol.

A lookup engine, which may in an example embodiment comprise multiple lookup engines 56.1 to 56.N, may access rules in secondary lookup tables (shown by block 124). The secondary lookup engines 56.1 to 56.N may be generated by the key extraction module 54, as described above, from a primary lookup table, e.g., table 80, based on a rule set associated with commonality of entries in the primary lookup table 80. As mentioned, in one example embodiment the rule set may comprise rules to identify the commonality of entries in multiple fields of the primary lookup table 80 in order to extract a selection of classification rules and fields. For example, the commonality of entries in the multiple fields of the primary lookup table may be wildcard entries.

Block 126 shows the lookup engines 56.1 to 56.N comparing, in an example embodiment, the respective header elements of the data packet to the respective field entries of each rule of the secondary lookup tables. As shown by block 128, each lookup engine 56.1 to 56.N may generate rule results for each of the secondary lookup tables. In an example embodiment, the generated rule results may be in a combinable format and may comprise a result (which may be generated through an AND operation) for each of the rules in a secondary lookup table. For example, the rule results may be a bitmap for each of the classification rules contained in the secondary lookup tables and may be combined, by a group logic module 58, to provide a result for the primary lookup table (shown by block 130). In one example embodiment, the group logic module 58 may perform an AND operation on the bitmap results generated by the lookup engines 56.1 to 56.N associated with the secondary lookup tables.

Figure 9:
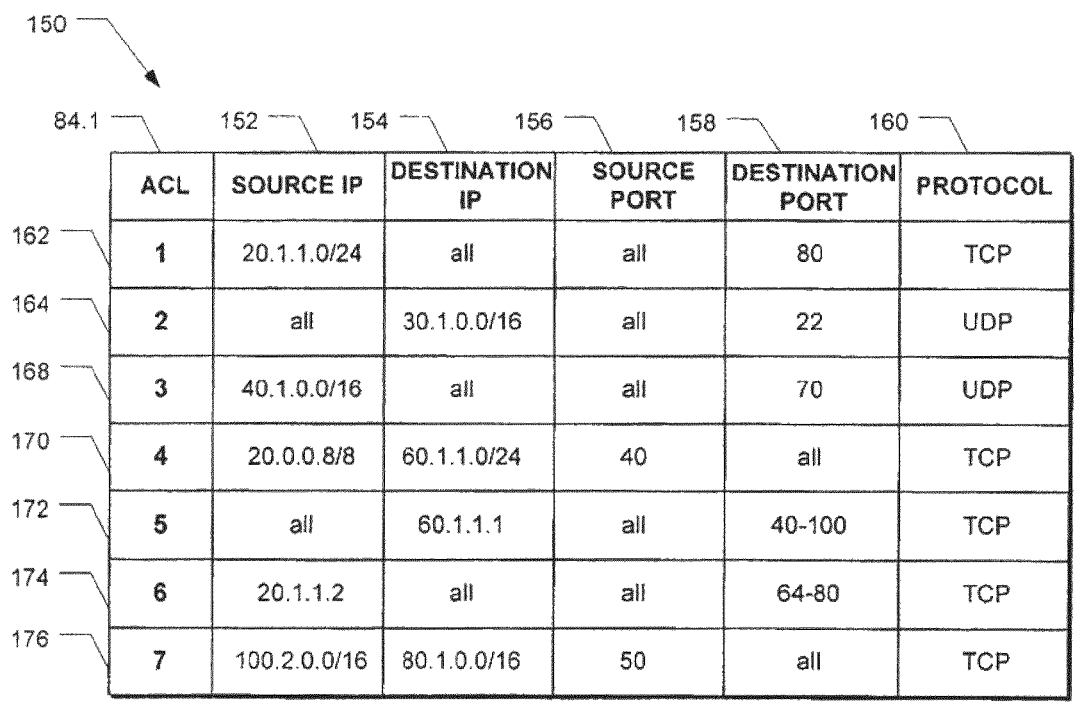
FIG. 9 shows an example embodiment of the primary lookup table of FIG. 3, the table showing access control lists (ACL) comprising fields of source IP address, destination IP address, source port, destination port and protocol, in accordance with an example embodiment.
Figure 10:
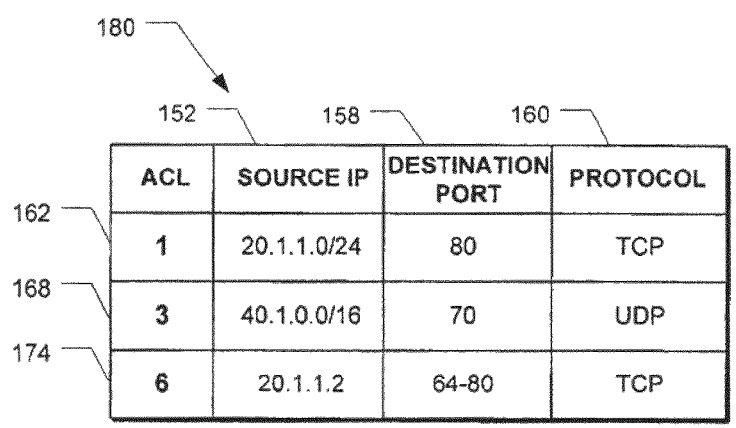

FIG. 9 shows an example embodiment of a primary lookup table 150 similar to the primary lookup table 80 of FIG. 3, with secondary lookup tables 180, 190 and 200 of FIGS. 10 to 12 being generated by the key extraction module 54 from the primary lookup table 150 using "don't care" or wildcard entries as part of a rule set. The primary lookup table 150 is, in this example embodiment, in the form of ACLs comprising a source IP address field 152, a destination IP address field 154, a source port field 156, a destination port field 158 and a protocol field 160.

As is shown by FIG. 9, different classification rules or access control entries (shown by reference numerals 162 to 176) may have different field entries wildcarded. For example, ACL Rule 1 (reference numeral 162) has the destination IP address field 154 and the source port 156 as "don't care" or wildcard entries.

The prior art Flexible Packet Classification Algorithm (FPCA) does not take these wildcard fields into consideration, which may result in memory space being wasted on unnecessary fields in the ACLs. This may further result in increased memory access times and processing times to classify data packets. For example, the primary lookup table 150 of FIG. 9 may generate, through classic FPCA, one set of bitmaps for all the fields, with the size of each bitmap being 7, corresponding to the number of ACL rules, although this may not be necessary due to the wild card entries in the table.

In accordance with the example methods described in this disclosure, the key extraction module 54 may examine the primary lookup table 150 or ACLs of FIG. 9 to generate the secondary lookup tables 180, 190 and 200 comprising various ACLs or rules.

For the first secondary lookup table 180, the key extraction module 54 may select the source IP address field 152, destination port field 158 and protocol field 160 according to a rule set, resulting in this secondary lookup table 180 not containing fields for the destination IP address 154 and source port 156. The entries of non-selected fields (e.g., destination IP address 154 and source port 156) may now be investigated by the key extraction module 54 to find any entries of commonality or in this example embodiment, "don't care" or wildcard entries.

In response to this examination, the key extraction module 54 selects the rules containing wildcard entries in the non-selected fields as rules for the first secondary lookup table 180. As shown by FIG. 10, three rules namely ACL 1 (reference numeral 162), ACL 3 (reference numeral 166) and ACL 6 (reference numeral 174) are selected. In an example embodiment, the appropriate lookup engine 56.1 to 56.N may generate a rule result as a bitmap with a size of 3.

Similarly, and in accordance with this example embodiment, the second secondary lookup table 190 of FIG. 11 may be generated by the key extraction module 54 first selecting the destination IP address field 154, destination port field 158 and protocol field 160, with this secondary lookup table 190 not comprising fields for the source IP address 152 and source port 156. The entries of non-selected fields (e.g., source IP address 152 and source port 156) may now be investigated by the key extraction module 54 to find any entries of commonality or in this example embodiment, "don't care" or wildcard entries and may select the rules containing wildcard entries in the non-selected fields as rules for the second secondary lookup table 190. As shown by FIG. 11, two rules namely ACL 2 (reference numeral 164) and ACL 5 (reference numeral 172) are selected. The appropriate lookup engine 56.1 to 56.N may then generate a rule result as a bitmap with a size of 2.

The third secondary lookup table 200 of FIG. 12 may be generated by the selection of the source IP address field 152, destination IP address field 154, source port field 156 and protocol field 160. The entries of non-selected fields (e.g., destination port 158) may now be investigated by the key extraction module 54 to also find wildcard entries, selecting rules ACL 4 (reference numeral 170) and ACL 7 (reference numeral 176) which contain wildcard entries in the non-selected fields as rules for the third secondary lookup table 200 to be generated. The appropriate lookup engine 56.1 to 56.N may then generate a rule result as a bitmap with a size of 2.

The lookup engines, which may in this example embodiment comprise three lookup engines, the number of lookup engines being equal to the number of secondary lookup tables 180, 190 and 200, may, as mentioned above, perform traditional FPCA or may use TCAM for comparing elements of a data packet to the entries in the respective secondary lookup tables 180, 190 and 200.

In one example embodiment, a master bitmap may be maintained to be populated with the combined rule results generated by the group logic module 58 from the respective results of the various lookup engines. The operation may be started by first clearing the master bitmap.

For each secondary table, the elements parsed by the processor 52 from the header of a data packet may be compared with the field entries of each of the secondary lookup tables and may, by performing an AND operation, be combined to generate a combined bitmap result. For the bits that are 1's, matching rules or ACL indices may be inferred by looking up an array. The group logic module 58 may then set the master bitmap for the corresponding matching indices.

For example, a data packet may be received and parsed by the processor into the following header elements having the following values:

| Source IP | Dst IP  | Source Port | Dst Port | Protocol |
|-----------|---------|-------------|----------|----------|
| 20.1.1.2  | 60.1.1.1 | 40         | 80       | TCP      |

For this data packet, and in accordance with an example embodiment, the rule result, e.g., the bitmap result generated from an AND operation performed on the result of each of the rules of the first secondary lookup table 180 of FIG. 10, is "101", with the corresponding matching ACL indices being ACL 1 and ACL 6. Similarly, the bitmap rule result for the second secondary lookup table 190 of FIG. 11 is "01", with the matching ACL index being ACL 5. The bitmap result for the third secondary lookup table 200 of FIG. 12, is "10", with the matching ACL index being ACL 4.

As mentioned, in this example embodiment, the master bitmap may have a size of 7. The group logic module 58 operation may commence the process of combining the different bitmaps by first clearing the master bitmap. The group logic module 58 may infer the matching rules or ACL after each secondary table lookup operation performed by the lookup engines, and may set the master bitmap with the corresponding matching rules. In the above example, the master bitmap will have a value "1001110" which relates to the following result:

| ACL 1 | ACL 2 | ACL 3 | ACL 4 | ACL 5 | ACL 6 | ACL 7 |
|---|---|---|---|---|---|---|
| 1 | 0 | 0 | 1 | 1 | 1 | 0 |

In example embodiments where the packet classifier 50 processes N fields in the packet, the worst case number of tables is $2^N$.

Also, in processing data packets with the example methods described in the present disclosure, the amount of memory and/or time to be spent on generating separate secondary lookup tables is to be balanced with the amount of memory and/or time to be spent by the packet classifier 50 on combining the results of the multiple secondary lookup tables into results for the primary lookup table. In the example embodiment described here above, more memory/time will be spent on generating the secondary lookup tables from the primary lookup table.

Figure 13:
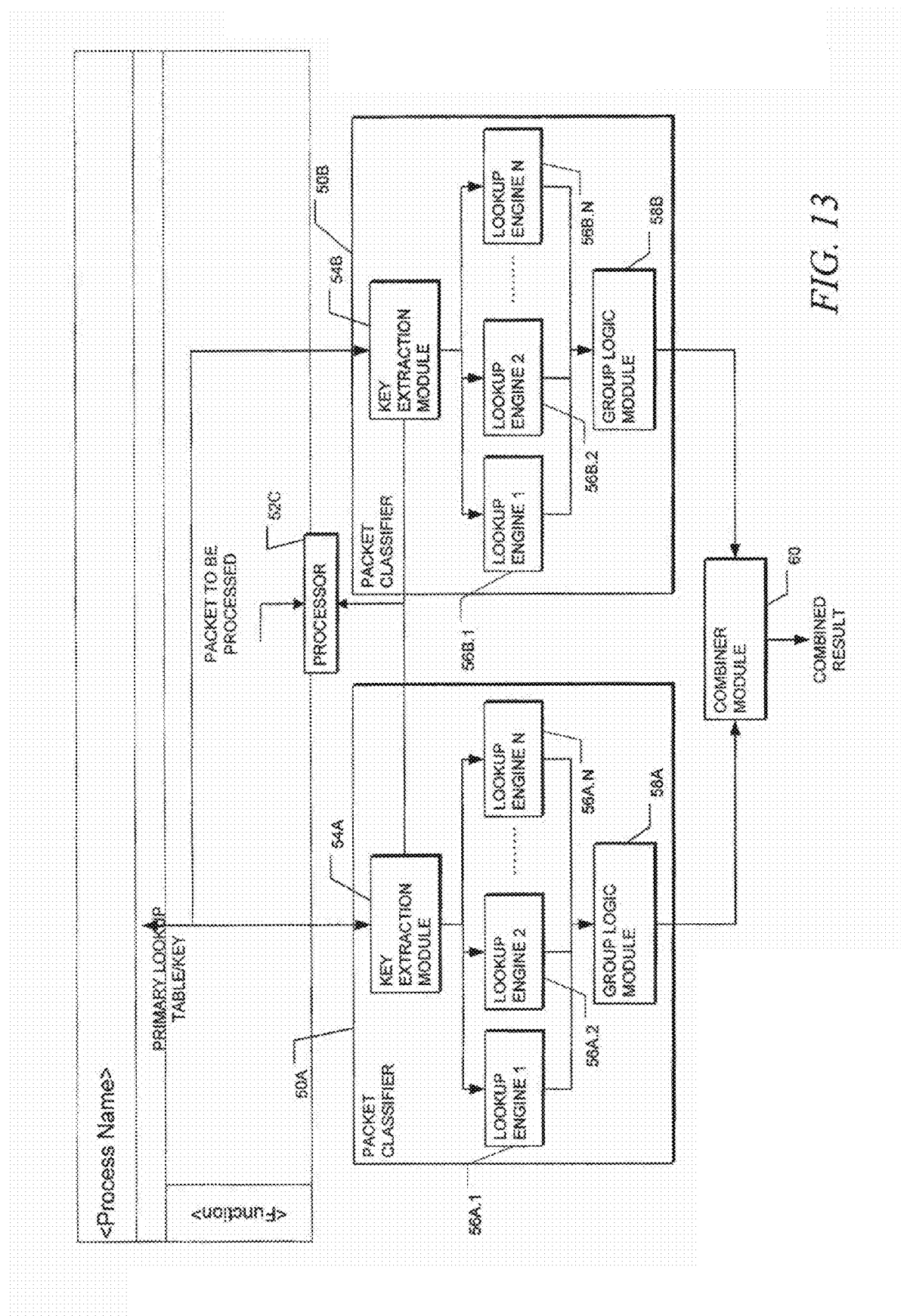
FIG. 13 shows an example embodiment of the configuration between two apparatuses in the form of packet classifiers that may form part of a network device included in the system of FIG. 1.

FIG. 13 shows an example embodiment of two packet classifiers 50A and 50B used in combination to provide a combined result or master bit to a primary lookup table. Both packet classifiers 50A and 50B may form part of a network device included in the system of FIG. 1.

In one example embodiment, the packet classifiers 50A and 50B are identical to the packet classifier 50 described in accordance with FIG. 2, apart from the packet classifiers 50A and 50B sharing an external processor 52C. In order to indicate that the packet classifiers 50A and 50B may be identical to the packet classifier 50 described in accordance with FIG. 2, the same reference numerals have been used for each respective component of the packet classifiers, although a suffix of "A" or "B" has been included in the reference numerals to distinguish between the separate modules.

In an example embodiment, the key extraction modules 54A and 54B access a primary lookup or rule table defining packet classification rules. The key extraction modules 54A and 54B of the respective packet classifiers may generate multiple secondary lookup or rule tables from the primary lookup table 80 by extracting, for each secondary lookup table, a part of the primary lookup table. For example, a selection of classification rules and a selection of fields of the multiple fields based on a rule set identifying predefined entries may be extracted. This process has been described in detail in accordance with FIG. 2.

For example, the rule set may comprise rules to identify a commonality of entries in the multiple fields of the primary lookup table in order to extract the selection of classification rules, e.g., the commonality of entries may be wildcard entries.

Once the secondary lookup tables have been generated by the key extraction module 54, the lookup processing of data packets received by a network device may commence with the processor 52C parsing the header of a data packet into different header elements. The lookup process may be based on the multiple secondary lookup tables.

In an example embodiment, the respective lookup engines 56A.1 to 56A.N and 56B.1 to 56B.N may access the selected rules in the secondary lookup tables generated by the respective key extraction modules 54A and 54B from the primary lookup table. The respective lookup engines 56A.1 to 56A.N and 56B.1 to 56B.N may further compare header elements of the parsed data packet to each of the field entries in a particular rule of the secondary lookup tables.

Each of the lookup engines may generate a rule result for its associated secondary lookup table, which is respectively combined by group logic modules 58A and 58B of the two packet classifiers. These combined result bitmaps may then be mapped to a global bitmap (or master bitmap) by a combiner module 60.

In one example embodiment, the group logic modules 58A and 58B or the combiner module 60 or the combination of these modules may group the multiple secondary lookup tables into secondary lookup table groups and may generate a mapping table to map the rule results of each of the secondary lookup tables and their elements into results for the secondary lookup table groups. It will be appreciated that these modules may be configured to regroup the multiple secondary lookup tables into different secondary lookup table groups, whenever needed.

Also, the combiner module 60 may combine the rule results for each of the secondary lookup tables forming part of a secondary lookup table group to provide a result for the secondary lookup table group.

In one example embodiment, a secondary lookup table group comprising more secondary lookup table may combine rule results in relation to a number of the secondary lookup tables. For example, the group with more lookup tables would handle a wider lookup size, while a group with less lookup tables would handle a narrower lookup size.

From this disclosure it will be evident that the apparatus and methods of the example embodiments provide for the configuration of different secondary lookup tables having varying sizes. The varying sizes of the secondary lookup tables enable the packet classifier to limit the amount of memory and time spent on processing and classifying data packets. The generation of the secondary lookup tables (e.g., the key extraction process) may further be flexible and may be controlled by certain fields, e.g., IPv4 and IPv6 protocols may have different extraction processes although the same secondary lookup tables may be used.

Figure 14:
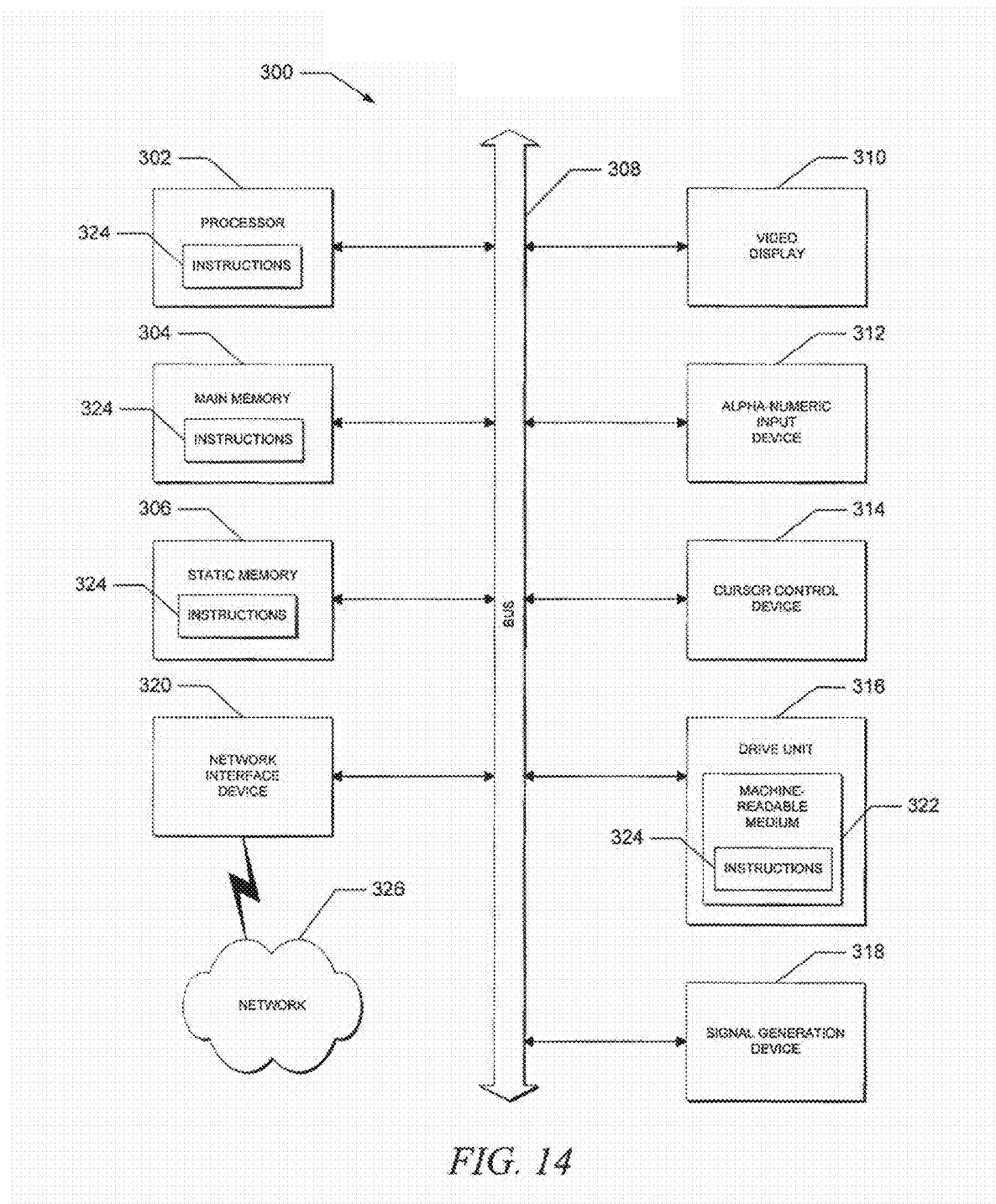
FIG. 14 shows a diagrammatic representation of machine in the example form of a computer system within which a set of instructions, for causing the machine to perform any one or more of the methodologies discussed herein, may be executed.

FIG. 14 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a plasma display, a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
accessing a primary lookup table defining packet classification rules, each classification rule having multiple fields;
generating by one or more processors multiple secondary lookup tables from the primary lookup table by extracting, for each secondary lookup table, a selection of classification rules and a selection of fields from the multiple fields, based on a rule set identifying predefined entries; and
grouping the multiple secondary lookup tables into secondary lookup table groups and generating a mapping table to map rule results of each of the secondary lookup tables into results for the secondary lookup table groups.

2. A non-transitory machine-readable medium with instructions stored thereon which, when executed by one or more processors, cause the one or more processors to:
generate multiple secondary lookup tables from a primary lookup table by extracting, for each secondary lookup table, a part of the primary lookup table;
perform a lookup process on a header of a packet based on the multiple secondary lookup tables;
generate rule results for the secondary lookup tables in a combinable format; and
group the multiple secondary lookup tables into secondary lookup table groups and generate a mapping table to map rule results of each of the secondary lookup tables into results for the secondary lookup table groups.

3. The non-transitory machine-readable medium according to claim 2, wherein the mapping table is configured to regroup the multiple secondary table groups into different secondary lookup table groups.

4. The non-transitory machine-readable medium according to claim 2, wherein the combinable format is a bitmap of matching results for entries in the secondary lookup tables.

5. The non-transitory machine-readable medium according to claim 2, wherein the rule results for each of the secondary lookup tables forming part of a secondary lookup table group are combined to provide a result for the secondary lookup table group.

6. The non-transitory machine-readable medium according to claim 5, wherein a size of the result of the secondary lookup table group is dependent on the number of the secondary lookup tables.

7. An apparatus comprising:
means for generating multiple secondary lookup tables from a primary lookup table by extracting, for each secondary lookup table, a part of the primary lookup table;
means for performing a lookup process on a header of a packet based on the multiple secondary lookup tables;
means for generating rule results for the secondary lookup tables in a combinable format;
means for grouping the multiple secondary lookup tables into secondary lookup table groups; and
means for generating a mapping table to map rule results of each of the secondary lookup tables into results for the secondary lookup table groups.

8. The apparatus of claim 7, wherein the mapping table is configured to regroup the multiple secondary table groups into different secondary lookup table groups.

9. The apparatus of claim 7, wherein the combinable format is a bitmap of matching results for entries in the secondary lookup tables.

10. The apparatus of claim 7, wherein the rule results for each of the secondary lookup tables forming part of a secondary lookup table group are combined to provide a result for the secondary lookup table group.

11. The apparatus of claim 10, wherein a size of the result of the secondary lookup table group is dependent on the number of the secondary lookup tables.

12. An apparatus comprising:
one or more processors; and
a non-transitory machine-readable medium in communication with the one or more processors, the non-transitory machine-readable medium having a key extraction module executable by the one or more processors and configured to:
  access using the one or more processors, a primary lookup table defining packet classification rules, each classification rule having multiple fields;
  generate using the one or more processors, multiple secondary lookup tables from the primary lookup table by extracting, for each secondary lookup table, a selection of classification rules and a selection of fields of the multiple fields based on a rule set identifying predefined entries, wherein the rule set comprises rules to identify a commonality of entries in the multiple fields of the primary lookup table; and
group using the one or more processors, the multiple secondary lookup tables into secondary lookup table groups and generate a mapping table to map the rule results of each of the secondary lookup tables into results for the secondary lookup table groups.

13. The apparatus of claim 12, wherein the commonality of entries in the multiple fields of the lookup table is wildcard entries.

14. The apparatus of claim 13 wherein the one or more processors parse the header of a data packet into header elements.

15. The apparatus of claim 14 which comprises a lookup engine to access rules in the multiple secondary lookup tables generated from the primary lookup table in order to process the data packet.

16. The apparatus of claim 15 wherein the lookup engine compares the respective header elements of the data packet to fields of the secondary lookup tables.

17. The apparatus of claim 16, which comprises multiple lookup engines and wherein each lookup engine is associated with one of the multiple secondary lookup tables.

18. The apparatus of claim 17, wherein each of the lookup engines generates a rule result for its associated secondary lookup tables.

19. The apparatus of claim 18, wherein the rule result is in a combinable format.

20. The apparatus of claim 19, which comprises a group logic module to combine the rule results of the multiple lookup engines to provide a result for the primary lookup table.

* * * * *

UNITED STATES PATENT AND TRADEMARK OFFICE
CERTIFICATE OF CORRECTION

| | | |
|---|---|---|
| PATENT NO. | : 8,139,586 B2 | Page 1 of 1 |
| APPLICATION NO. | : 12/860757 | |
| DATED | : March 20, 2012 | |
| INVENTOR(S) | : Ming Zhang et al. | |

It is certified that error appears in the above-identified patent and that said Letters Patent is hereby corrected as shown below:

On the face page, in field (56), under "Other Publications", in column 2, line 4, delete "Aigorithms" and insert -- "Algorithms --, therefor.

Signed and Sealed this
Nineteenth Day of June, 2012

David J. Kappos
*Director of the United States Patent and Trademark Office*